United States Patent [19]

Portmann

[11] Patent Number: 4,695,889
[45] Date of Patent: Sep. 22, 1987

[54] CHARGE ACCUMULATION READ-OUT DEVICE WITH SIMULTANEOUSLY READ MULTIPLE OUTPUT SIGNALS

[75] Inventor: Jacques Portmann, St. Egreve, France

[73] Assignee: Thomson CSF, Paris, France

[21] Appl. No.: 828,743

[22] Filed: Feb. 12, 1986

[30] Foreign Application Priority Data

Feb. 12, 1985 [FR] France ................. 85 01972

[51] Int. Cl.[4] ............................................. H04N 1/024
[52] U.S. Cl. ........................... 358/213.26; 358/213.29; 357/24; 377/63
[58] Field of Search .................. 358/213, 199; 357/24 LR; 377/57, 60, 63; 250/370.08, 370.09, 370.10

[56] References Cited

U.S. PATENT DOCUMENTS

| | | | |
|---|---|---|---|
| 4,280,141 | 7/1981 | McCann et al. | 358/213 |
| 4,288,764 | 9/1981 | Ong | 377/63 |
| 4,327,377 | 4/1982 | Takken | 358/199 |
| 4,609,823 | 9/1986 | Berger et al. | 357/24 LR |

OTHER PUBLICATIONS

3rd International Conference, The Technology & Applications of Charge Coupled Devices, Sep. 1976, pp. 315–325.
Patents Abstracts of Japan, vol. 5, No. 167, Oct. 24, 1981.

Primary Examiner—Gene Z. Rubinson
Assistant Examiner—Stephen Brinich
Attorney, Agent, or Firm—Cushman, Darby & Cushman

[57] ABSTRACT

Charge accumulation read-out device of photosensitive detectors comprising a charge transfer shift register which receives the information from N detectors disposed in the same line. This register has the same storage area over the whole of its length and conveys the information collected at different times from these detectors without mixing it, means provide simultaneously several read-outs of the charges stored by certain given stages of the register, which ensures in phase summation of the information. The invention concerns the application of TDI read-out to photosensitive detector matrices.

14 Claims, 21 Drawing Figures

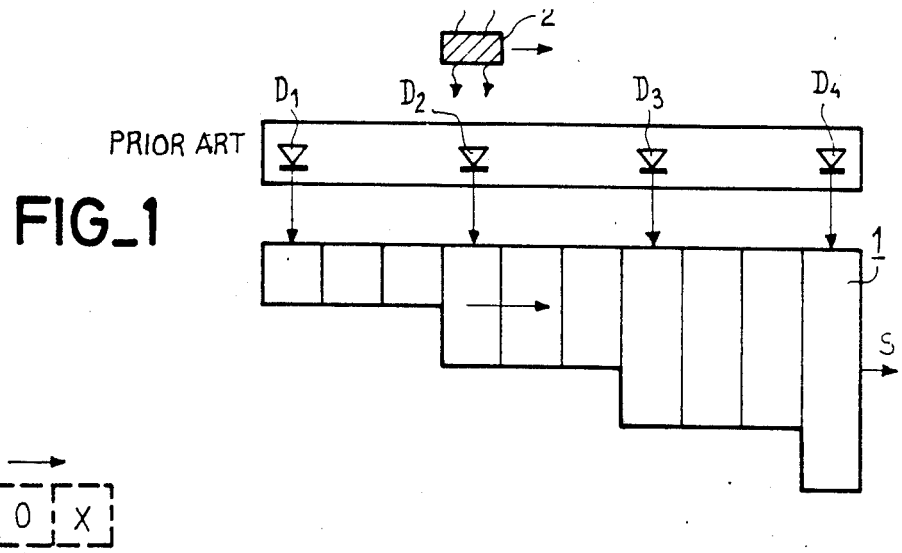
FIG_1 PRIOR ART
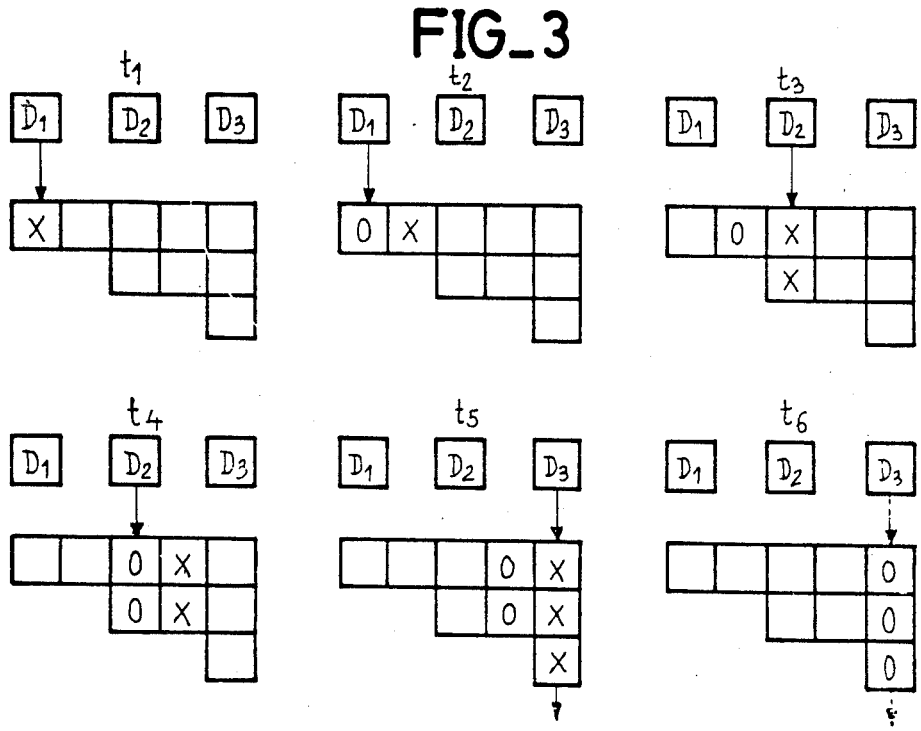
FIG_2
FIG_3

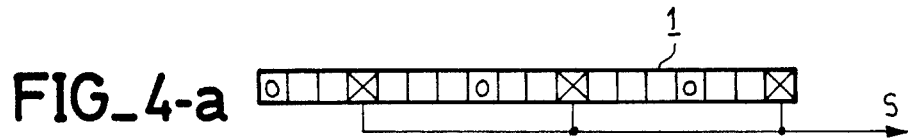
FIG_4-a
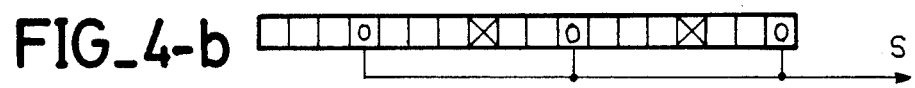
FIG_4-b
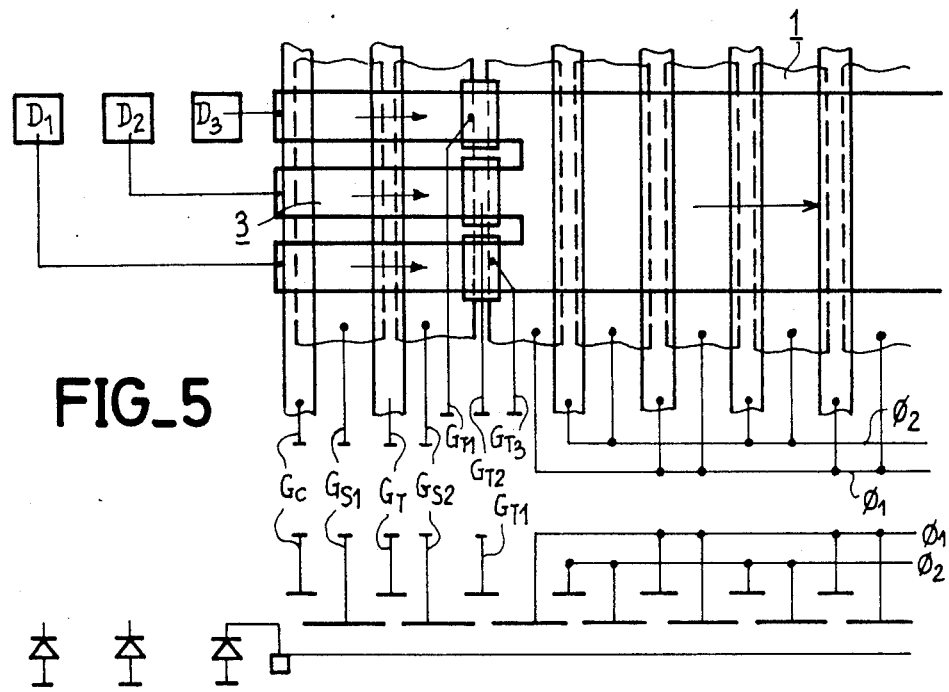
FIG_5
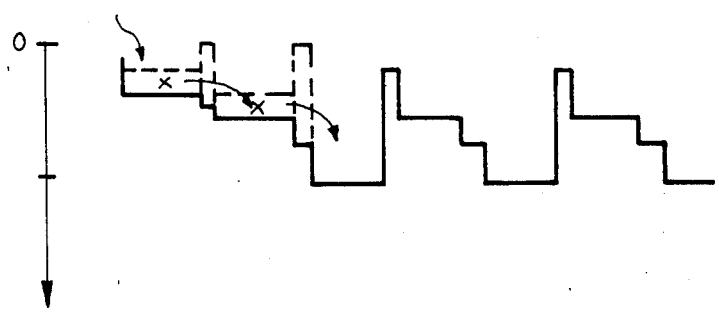
FIG_6

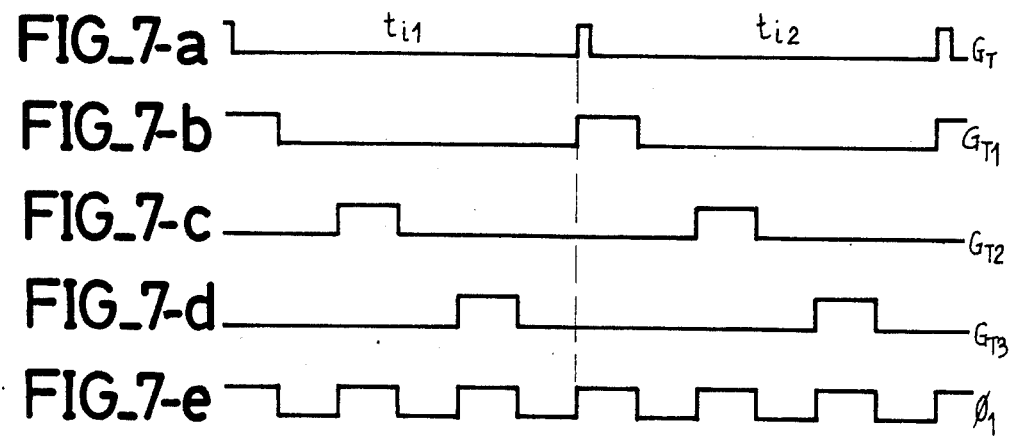
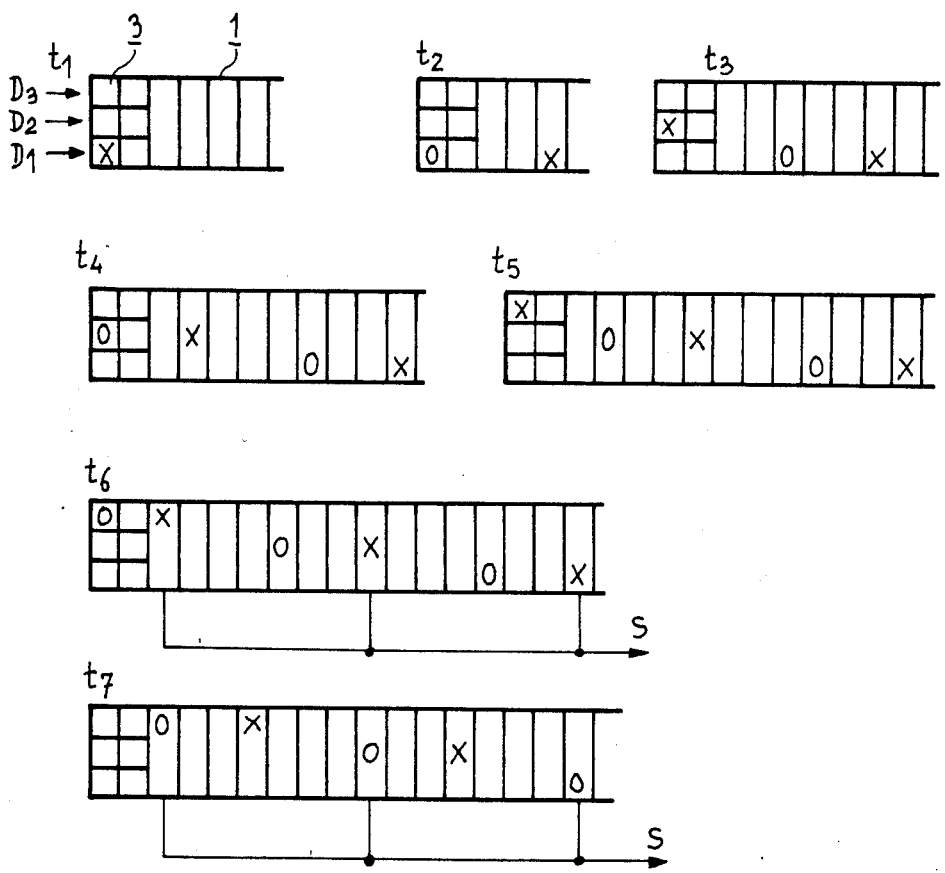

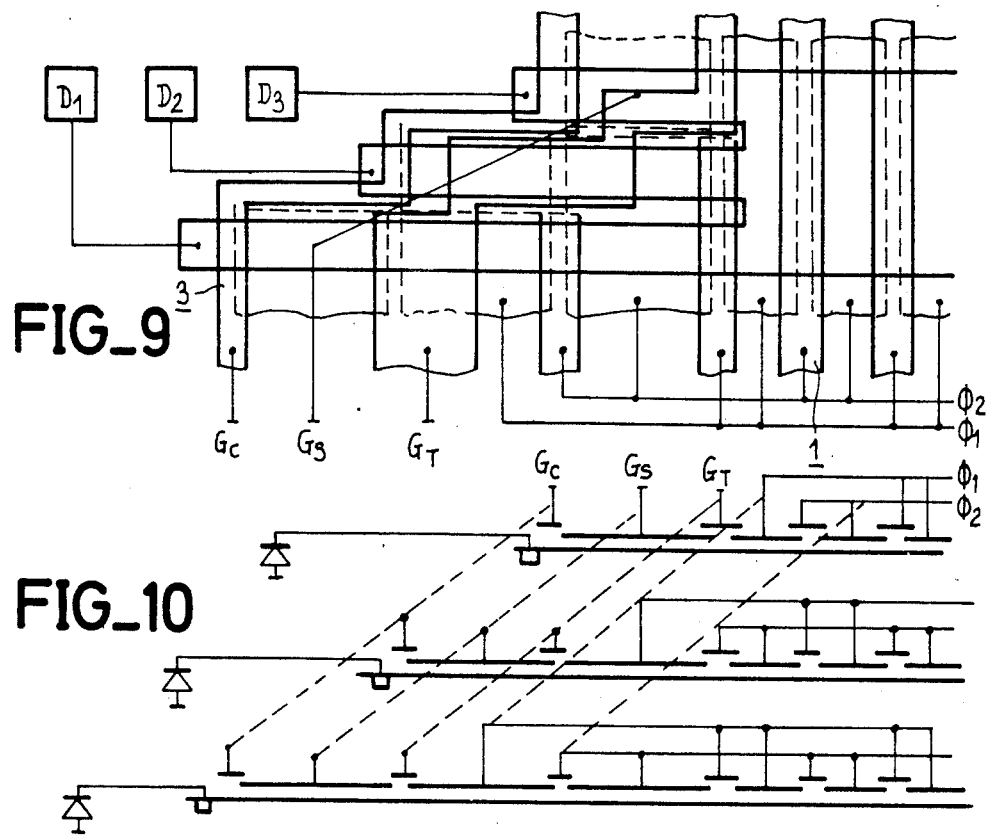
FIG_9
FIG_10
FIG_11-a
FIG_11-b
FIG_12
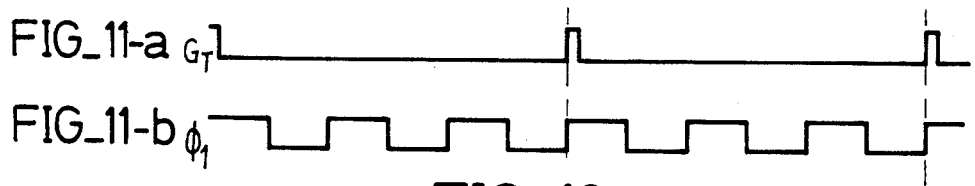
FIG_13
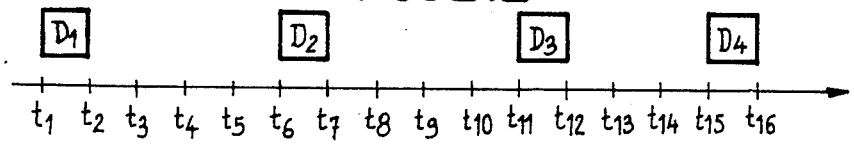

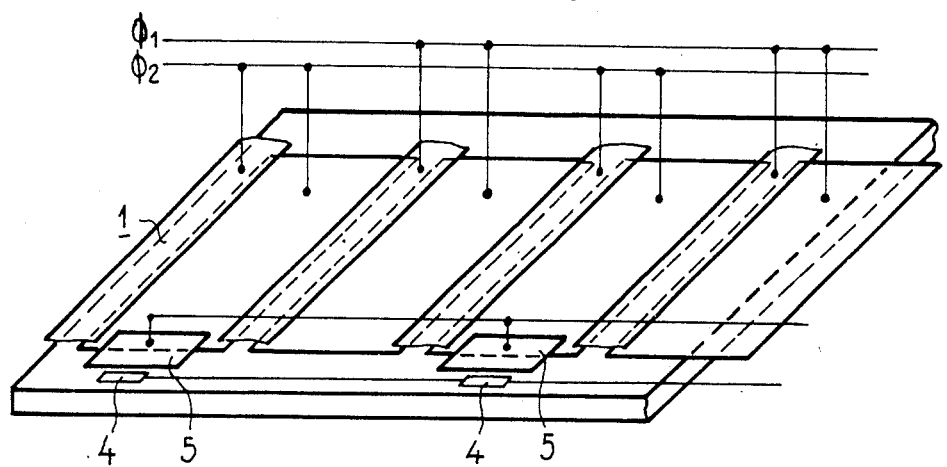
FIG_14
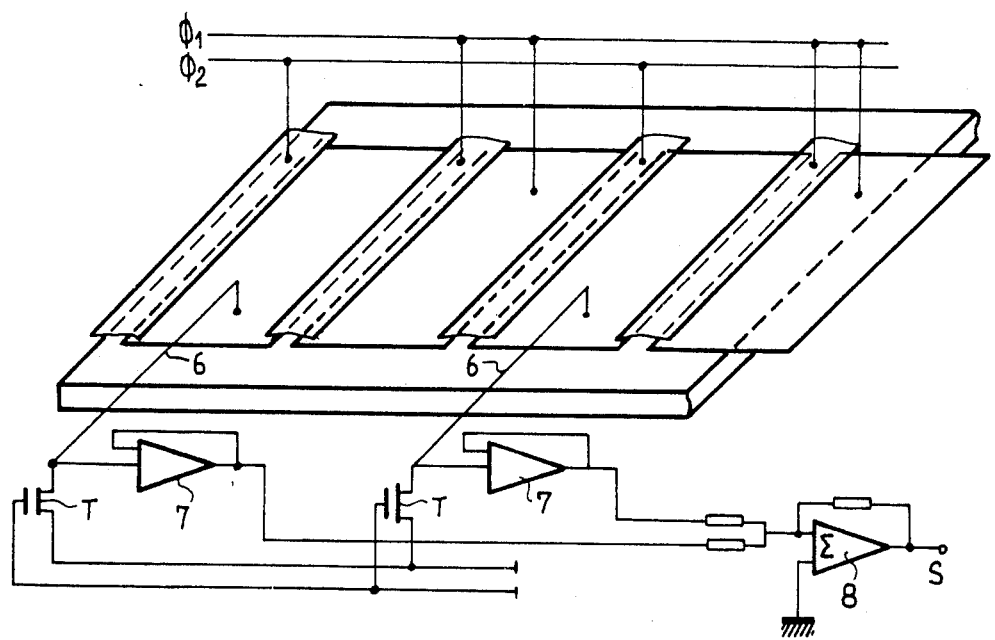
FIG_15

4,695,889

CHARGE ACCUMULATION READ-OUT DEVICE WITH SIMULTANEOUSLY READ MULTIPLE OUTPUT SIGNALS

BACKGROUND OF THE INVENTION

1. Field of the Invention

The present invention relates to a charge accumulation read-out device of photosensitive detectors.

2. Description of the Prior Art

It is well known in the prior art to construct read-out devices which use charge accumulation of photosensitive detectors using a charge transfer shift register with parallel inputs and a series output whose stages have an increasing capacity depending on the direction of transfer of the charges. Such a device is shown in FIG. 1 where the photosensitive detectors are shown by the references $D_1$, $D_2$, $D_3$ and $D_4$ and the charge transfer shift register by the reference 1. Such a device is known under the name of "time delay integration" or TDI and it will be thus referred to hereafter.

In FIG. 1, an arrow indicates the relative direction of movement of the source 2 of radiation to be detected and of the detectors.

If N, detectors are used, the integration time is multiplied by a factor N provided that the information collected at the different detectors is summed in synchronism with the movement. The accumulation of the charges occurs automatically in the stages of the register whose capacity is increasing in the charge transfer direction, shown by an arrow in the shift register.

With the integration time multiplied by N and the read-out noise being added quadratically, a gain is obtained on the signal to noise ratio equal to $\sqrt{N}$.

The problem which arises is that it is desirable to provide a read-out with charge accumulation for photosensitive detector matrices in which the detectors are distributed in several lines. Registers with increasing capacity prove to be too space consuming, perpendicularly to the charge transfer direction, to be able to be used without problems.

The present invention provides a solution to this problem and allows TDI read-out to be adapted to a photosensitive detector matrix.

SUMMARY OF THE INVENTION

The present invention provides a charge accumulation read-out device of photosensitive detectors comprising at least one charge transfer shift register receiving the information from N detectors disposed in the same line, this device providing in phase summation of the information collected from these detectors, wherein:

(a) the charge transfer shift register has a same storage area over the whole of its length and conveys the informations collected at different times from these detectors without mixing it;

(b) means provide, simultaneously, several read-outs of the charges stored by certain given stages of the register, which ensures in phase summation of the informations.

BRIEF DESCRIPTION OF THE DRAWINGS

Other objects, features and results of the invention will be clear from the following description, given solely by way of non limitative example and illustrated by the accompanying Figures which show:

FIG. 1, a charge accumulation read-out device of photosensitive detectors, of the TDI type, such as known in the prior art;

FIG. 2, three detectors in front of which an image travels;

FIG. 3, how the image of FIG. 2 is processed by a TDI device of the prior art;

FIGS. 4a and b, how the image of FIG. 2 is processed by a device of the invention;

FIGS. 5 to 11b, two embodiments of charge accumulation read-out devices of photosensitive detectors in accordance with the invention, diagrams explaining their operation and examples of control signals which may be used;

FIG. 12, an example of using a device of the invention with four detectors and four integration times between detectors;

FIG. 13, a table showing the read-outs to be performed;

FIGS. 14 and 15 two variants for the read-out of a device according to the invention.

In the different Figures, the same references designate the same elements but, for the sake of clarity, the sizes and proportions of different elements have not been respected.

DESCRIPTION OF THE PREFERRED EMBODIMENTS

FIG. 2 shows schematically three aligned photosensitive detectors $D_1$, $D_2$, $D_3$, in front of which travels an image formed of two points X and O. The travel of the image is in synchronism with the integration time of the detectors. Two successive integration times are reserved for each detector: the times $t_1$ and $t_2$ for detector $D_1$, $t_3$ and $t_4$ for detector $D_2$ and $t_5$ and $t_6$ for detector $D_3$. The information coming from detector $D_1$ at time $t_1$ is the same as that coming from detector $D_2$ at time $t_3$ and as that coming from detector $D_3$ at time $t_5$.

The same reasoning applies for the information, different from the preceding information, which comes from detectors $D_1$, $D_2$, $D_3$ at times $t_2$, $t_4$ and $t_6$.

In FIG. 3 there has been shown schematically, at times $t_1$ to $t_6$, how the information is processed in a TDI of the type shown in FIG. 1 which receives an image under the conditions shown in FIG. 2. The information collected from the different detectors is summed in synchronism with the movement through the stages of the increasing capacity register.

At time $t_5$, an output signal S equal to 3.X may be read at an output of the register, and at time $t_6$ a signal S equal to 3.0 may similarly be read.

FIGS. 4a and 4b show schematically how the information is processed in the case of a charge accumulation read-out device of photosensitive detectors in accordance with the invention which receives an image under the conditions shown in FIG. 2.

A linear charge transfer shift register is used which has the same storage area over the whole of its length and which conveys the information collected at different times from detectors $D_1$, $D_2$, $D_3$ without mixing it.

The accumulation of the charges does not take place in the register but by simultaneous read-out of the charges stored under certain given electrodes of the register.

In FIG. 4a, it has been shown that the simultaneous read-out of three given cells of the register gives an output signal S equal to 3.X.

FIG. 4b shows that the simultaneous read-out of the same three cells of the register gives an output signal S equal to 3.0.

FIGS. 5 to 11 show two embodiments of charge accumulation read-out devices of photosensitive detectors. in accordance with the invention, diagrams explaining the operation of these devices and control signals which may be used.

FIG. 5 shows schematically a top view of one embodiment of a device in accordance with the invention.

FIG. 6 is a cross sectional view of the device of FIG. 5, with diagrams of surface potentials illustrating the charge transfer.

This device comprises a linear charge transfer shift register 1 which has the same storage area over the whole of its length. The electrodes of this register receive control signals $\phi_1$ and $\phi_2$ in phase opposition.

In FIG. 7e, the signal $\phi_1$ is shown.

The register 1 is preceded by an input stage 3 of special structure. This input stage comprises three parallel inputs to which three detectors $D_1$, $D_2$, $D_3$ are connected. Injection into the input stage of the charges coming from the detectors may be provided in different ways well known in the prior art. Each of these inputs controls a channel in which the charge transfer takes place in the same direction as in the register. Each channel is formed by two charge storage grids $G_{S1}$ and $G_{S2}$ surrounded from left to right by two transfer grids $G_C$ and $G_T$ and by a transfer grid, called $G_{T1}$, $G_{T2}$ or $G_{T3}$, which controls the access of each channel to the register.

The grid $G_C$ may be at a constant potential. In FIGS. 7a, b, c and d have been shown control signals applicable to the grids $G_T$, $GT_1$, $G_{T2}$ and $G_{T3}$.

In FIG. 8 there has been shown schematically, at different times $t_1$ to $t_7$, how the information is processed in the device of FIG. 5, which receives an image under the conditions shown in FIG. 2.

During the integration time $t_1$, the information X is input into the first storage zone $G_{S1}$ of the lower channel of the input stage which is connected to the detector $D_1$.

During the integration time $t_2$, the information O is input into the same storage zone $G_{S1}$ of the same channel, whereas the information X is transferred into the second storage zone $G_{S2}$, by the pulse supplied to grid $G_T$ then into the first, second and third stages of register 1 by the control signals $\phi_1$, $\phi_2$, applied to the grids of the register. The pulse supplied to grid $G_T$ is generally of short duration compared with the integration time. It is applied immediately after the integration time $t_1$. It can be seen in FIG. 7e that these signals $\phi_1$ and $\phi_2$ have a frequency three times greater than that of the signals $G_T$, $G_{T1}$, $G_{T2}$, $G_{T3}$.

During the integration time $t_3$, the information X enters the first storage zone $G_{S1}$ of the median channel of the input stage which is connected to the detector $D_2$.

In the lower channel of the input stage, the information O is transferred to the second storage zone $G_{S2}$, then to the first, second and third stages of the register 1. The information X from the lower channel continues its progress through the register 1.

During integration time $t_4$, the information O enters the median channel. The information X passes from the first zone to the second storage zone of the median channel, then to the first and second stages of the register 1.

During the integration time $t_5$, the information X enters the first storage zone of the upper channel connected to the detector $D_3$. The information O of the median channel passes from the first to the second storage zones, then to the first and second stages of register 1.

During the integration time $t_6$, the information O enters the upper channel. The information X of the upper channel passes to the second storage zone $G_{S2}$, then to the first stage of register 1.

At time $t_6$, the simultaneous read-out of the information contained in a first, eighth and fifteenth stages of register 1 gives a signal S equal to 3.X. Register 1 is in the state shown in FIG. 4a.

At time $t_7$, the information O of the upper channel passes to the first stage of register 1. The other information continues its progress.

At time $t_7$, the simultaneous read-out of the informations contained in the same three stages of register 1 as at time $t_6$ gives a signal S equal to 3.0. Register 1 is in the state shown in FIG. 4b.

Different variants of the device shown in FIG. 5 may be used.

In particular, it is possible to use an input stage 3 comprising only a single storage zone leading to register 1. In this case the integration time must be sufficiently long and a part of the integration time must be used for transferring the charges stored in the different channels to the register.

In the embodiment which has been described above, an integration time is available for directing the information coming from the different detectors to the register 1.

Similarly, it is possible, between two integration times, to transfer charges from the first to the second storage zones.

FIGS. 9, 10 and 11 illustrate another embodiment of the device of the invention.

FIG. 9 is a top view of this device in which the input stage 3 can be seen followed by the charge transfer shift register 1.

This input stage comprises a single storage zone formed by a storage grid $G_S$ surrounded by a transfer grid $G_C$, at a constant potential, and by a transfer grid $G_T$ which controls the access of the charges coming from the whole of the input stage to register 1 and which receives the control signal shown in FIG. 11a.

As in the embodiment of FIG. 5, the input stage comprises parallel channels connected to the detectors of the same line. In FIG. 9, the input stage comprises three channels connected to the detectors $D_1$, $D_2$, $D_3$.

The configuration of the input stage 3 is such that the injection of the charges from the input stage to the register takes place in zones of the register offset in the charge transfer direction depending on where the charges of the different channels of the register come from.

Thus, in FIG. 9, the information transmitted by the lower channel is transferred to the first stage of register 1, the information transmitted by the median channel is transferred to the second stage of the register and the information transmitted by the upper channel is transferred to the third stage of the register.

The grids are designed so that these stages have the same storage capacity.

It can be seen in FIG. 9 that the grids $G_C$ and $G_T$ must be given a special "staircase" form so as to obtain injection of the charges offset in space in the register 1 depending on the different channels which the charges come from.

As in the embodiment shown in FIGS. 5 and 6, the frequency of the signals $\phi_1$ and $\phi_2$ is three times greater than that of the signal applied to grid $G_T$ which controls the transfer of charges in register 1. The signal $\phi_1$ is shown in FIG. 11b.

In this embodiment, as in the one of FIG. 5, in the case of an image such as the one shown in FIG. 2, two successive read-outs must be made of the same three stages of the register 1, so as to obtain accumulation of the charges of the detectors.

The devices of the invention may be used whatever the number of detectors and whatever the number of integration times between the read-out of each detector.

In FIG. 12, there has been shown schematically the case where four detectors $D_1$ to $D_4$ are used with four integration times between the read-out of each detector. These detectors $D_1$ to $D_4$ supply information called respectively A, B, C, and D with, as index, the index i of the integration time $t_i$.

In FIG. 13, there has been shown a table giving, for each detector, the information supplied during time. Thus, for example, detector $D_1$ supplies at times $t_1, t_2, t_3, \ldots$ the information $A_1, A_2, A_3. \ldots$ The diagonal of this table shows the points where simultaneous read-outs must be performed. In the case of FIG. 12, at time $t_6$ the informations $A_1$, $B_6$, $C_{11}$ and $D_{16}$ must be summated. A time $t_{17}$, the informations $A_2$, $B_7$, $C_{12}$ and $D_{17}$ will have to be summated and at times $t_{18}$ and $t_{19}$ the informations $A_3$, $B_8$, $C_{13}$, $D_{18}$, and $A_4$, $B_9$, $C_{14}$, $D_{19}$.

In this same table, the broken line arrow shows that in the case of four detectors with a single integration time between detectors, the information $A_1$, $B_3$, $C_5$ and $D_7$ must be summated first then the information $A_2$, $B_4$, $C_6$, $D_8$. . . .

In all cases, several successive read-outs must be effected of the same stages of the register.

Calculation shows that the number of stages of register 1 which are necessary for reading the N detectors, analyzed during $n.t_i$ integration times equals N×n.

In the example shown in FIG. 8, we have: N=3 and $n \cdot t_i = 5t_i$, that is N×n=3×5=15.

It can be seen in FIG. 8 that the two read-outs require a register with 15 stages.

In the case of the TDIs of the prior art, the number of stages of register 1 equals:

$$\frac{N \cdot (n + 1)}{2}$$

In the example of FIG. 3, we have: N=3 and n=5, namely $$\frac{N \cdot (n + 1)}{2} = \frac{3 \cdot (5 + 1)}{2} = 9.$$

The ratio of the stages of the register 1 required by the devices of the invention and of the prior art equal:

$$\frac{N \cdot n \cdot 2}{N \cdot (n + 1)} = \frac{2}{1 + 1/n}$$

The two devices tend to become identical in the number of stages for a large number of integration times $t_i$.

On the other hand, the device of the invention requires much less space in a direction perpendicular to the transfer, than the known devices.

The simultaneous read-out of the contents of several stages of register 1 may be provided in different ways known in the prior art.

In FIG. 14, it has been shown how destructive read-out of the charges may be obtained by read-out diodes.

Reference 4 designates the diodes disposed in the vicinity of the stages of the register which is to be read.

Grids 5 control the passage of the charges to the diodes.

The disadvantage of this type of read-out is that the register 1, when a first read-out has been performed, operates with stages emptied of their contents.

In FIG. 15, the method of reading on floating grids has been shown.

Connections 6 allow to read the potential of the grids of the stages of the register which are to be read, these grids being left floating. After being read-out, these grids are charged to a given potential by a voltage $V_{DD}$ applied through MOS T transistors controlled by a voltage V. Follower-connected amplifiers 7 connect the different connections 7 to a summator-connected amplifier 8 which delivers the output signal S of the device.

It will be noted that the charge read-out devices may be common to two shift registers 1.

What is claimed is:

1. A charge accumulation read-out device for information signal producing photosensitive detectors in a line to ensure in-phase summation of information, comprising:
    at least one charge transfer, multiple-stage shift register, adapted to be connected to receive information from N detectors disposed in the same line, and having a substantially constant storage capacity over the whole of its length and includes an output port wherein information collected at different times from said detectors can be output without mixing; and
    means for reading out, from said output port, charges stored in a plurality of stages of the register, said plurality of stages being read-out simultaneously to provide an in-phase summation of the informations.

2. The device as claimed in claim 1, further comprising a plurality of diodes in the vicinity of said register wherein said reading out means provide destructive read-out of charges on the diodes.

3. The device as claimed in claim 1, wherein stages of said register include grids which are left floating and said reading-out means provides non destructive read-out of the charges on said floating grids.

4. The device as claimed in claim 2, wherein said charge transfer shift register comprises an input stage having N parallel channels, each said channel connected to one of the N detectors and in which a charge transfer takes place in the same direction as in the register.

5. The device as claimed in claim 4, wherein said input stage further comprises N grids controlling a sequential transfer of the charges from each channel of the input stage to the register.

6. The device as claimed in claim 5, wherein said input stage further comprises two storage zones separated by a single transfer grid.

7. The device as claimed in claim 4, wherein said input stage further comprises a single grid controlling the transfer of charges from the input stage to the register, this grid having a special staircase form so as to ensure injection of the charges coming from the different channels of the input stage into different stages of the register.

8. The device as claimed in claim 3, wherein said charge transfer shift register comprises an input stage, having N parallel channels, each said channel connected to one of the N detectors and in which a transfer of the charges takes place in the same direction as in the register.

9. The device as claimed in claim 8, wherein said input stage further comprises N grids controlling a sequential transfer of the charges from each channel of the input stage to the register.

10. The device as claimed in claim 9, wherein said input stage further comprises two storage zones separated by a single transfer grid.

11. The device as claimed in claim 8, wherein said input stage further comprises a single grid controlling transfer of charges from the input stage to the register, this grid having a special staircase form so as to ensure injection of the charges coming from the different channels of the input stage into the different stages of the register.

12. A device as in claim 1 further comprising said N detectors.

13. A charge accumulation read-out device for obtaining an in-phase summation of charges on a plurality of detectors, comprising:
charge transfer shift register means, adapted to be connected to receive information from said plurality of detectors, for storing said information therein, said charge transfer shift register means having a plurality of stages, and a substantially constant storage capacity in each of said stages; and
means for reading-out charges stored in a plurality of said stages, said reading-out of said plurality of stages being simultaneously accomplished, to provide an in phase summation of information in said plurality of stages.

14. An apparatus as in claim 13 further comprising said plurality of detectors.

* * * * *